United States Patent Office

3,527,563
Patented Sept. 8, 1970

3,527,563
PROCESS FOR PREPARING SILICA GEL GRANULES
Dunbar L. Shanklin, 12 Everett Ave.,
Winchester, Mass. 01890
No Drawing. Original application Apr. 19, 1965, Ser. No. 449,325, now Patent No. 3,350,244, dated Oct. 31, 1967. Divided and this application May 1, 1967, Ser. No. 645,086
Int. Cl. C01b *33/18*
U.S. Cl. 23—182                 4 Claims

ABSTRACT OF THE DISCLOSURE

A process for producing porous and regularly shaped silica gel by reacting a finely divided ammonium salt with regularly shaped granules of an alkali metal metasilicate hydrate at a temperature below 110° F. The reaction is carried out in the absence of more than about one percent added water.

---

This application is a divisional of my copending application Ser. No. 449,325, filed Apr. 19, 1965 (now U.S. Pat. 3,350,244, dated Oct. 31, 1967) entitled "Flux Life Extender."

The parent application relates to a flux life extender especially adapted for use in connection with solder fluxes intended for use with high temperature solder baths for the purpose of extending the useful life of the flux on the bath. These extenders generally comprise granules of a porous particulate absorbent selected from the group consisting of activated alumina, silica gel and activated alumino-silicate having a minimum surface area and a minimum volume of available pores which granules may or may not be precharged with flux activating ingredient.

In the course of the work leading to the development of such flux life extenders, I discovered what appears to be a novel method of making an unusually light, highly porous, spherical, activated silica gel granule with its residual surface areas specially treated to increase its reactivity to highly polar gases such as $NH_3$, $CO_2$, HCl, and $H_2S$ and to regulate the relative moisture absorbency. This method is also especially adapted to making spherical granules of approximately the same diameter which results in maximum bulk per unit of weight and which affords the lowest resistance to passage of gases flowing through a bed of these activated silica gel granules.

Sodium metasilicate pentahydrate, $Na_2SiO_3 \cdot 5H_2O$, contains only 28.3 percent $SiO_2$ and yet has a very high percentage of combined $H_2O$. Because of the relatively low ratio of molecules of $SiO_2$ to $Na_2O$ (1:1) and the low percentage by weight of $SiO_2$ (28.3%,) sodium metasilicate pentahydrate is not a logical choice for use in manufacturing silica gel. Liquid solutions of sodium silicate containing $SiO_2$ and $Na_2O$ in the ratio of 3.3 molecules of $SiO_2$ to 1 molecule of $Na_2O$ are not only much cheaper on a dry pound weight basis but are also very much cheaper on a basis of pounds of $SiO_2$ content. However, I have been unable to produce the unique, very light, highly porous, activated and treated silica gel granules of spherical contour and approximately uniform size which are the subject of my invention by using any of the conventional well-known silica gel methods or processes.

The conventional methods vary, but essentially they consist of forming a wet silica gel mass by adding acids or salts of sodium silicate solutions (usually with high $SiO_2$:$Na_2O$ ratios such as 3.3:1), allowing this mass to set for several hours until it is well solidified and consolidated, breaking it up into wet granules and drying.

An alternative method is to dry the large masses of silica gel and then crush and screen the relatively hard dense silica gel blocks. In most cases, the silica gel is washed free of its salts, such as sodium chloride, sodium sulfate, etc. This washing can be performed either before or after drying.

These processes all result in fragmented particles of variable size and shape. When placed together in a random bed, the particles tend to lock and bridge together and are not free flowing as are the spherical granules of uniform size and shape produced by my new method.

In practice, my invention is extremely simple. I purchase uniform sized "dry" granules of the chemically stable, precise formulation compounded, sodium metasilicate pentahydrate ($Na_2SiO_3 \cdot 5H_2O$), and then react it in the "dry" solid state with ammonium chloride, ammonium sulfate, ammonium nitrate, or some similar ammonium salt which will neutralize the alkalinity of the sodium metasilicate and produce silica gel, ammonia gas, water and a corresponding sodium salt.

With this fundamentally simple process, by controlling the successive steps, I am able to produce a product of extremely low bulk density and high porosity and to maintain the original shape and size of the individual sodium metasilicate pentahydrate particles.

The preferred sodium metasilicate pentahydrate for use in this process is a grade of spherical uniform size particles which are produced commercially and can be purchased in sifted graded size as desired. The melting point of this sodium metasilicate pentahydrate is 162° F. I prefer a 12 mesh size, which is approximately $\frac{1}{32}''$ to $\frac{1}{16}''$ in diameter; but, the size is not material to my invention. I prefer this size only because some of the useful applications employ a layer of spherical activated silica gel granules only ¼ to ½ inch in thickness, and this size granules provides enough individual granules to maintain a proper layer.

In this process, which is set forth in some detail in Example 1 as well as in Examples 4 and 10, I dry mix the dry sodium metasilicate granules with approximately a stoichiometric amount based on the ammonium content of a finely divided ammonium containing salt. The reaction is normally spontaneous. However, under low humidity conditions it may be slow to start and under these conditions up to 1 percent of water which may be added in the form of a fine spray or which may be used to moisten the salt crystals or particles may be added to trigger the reaction. The use of exactly a stoichiometric amount of the salt is not necessary or in any way critical. A slight excess may be desired to insure completion of the reaction and an even greater excess may be used if the presence of the ammonium salt is desired in the final product. For some uses, however, the presence of a core of unreacted metasilicate in each granule may be desired in which case a deficiency of the ammonium salt is used.

Upon mixing, the particles of the salt coat the surface of the granules. As soon as a substantially uniform distribution is accomplished, the coated particles are spread out in thin layers, no more than several inches thick, preferably on large trays.

It is essential that the first stage of the reaction proceed slowly. As pointed out in Example 1, the ammonium salt reacts with the metasilicate releasing water, including the water of hydration, and ammonia, and forming silica gel and a salt. If the reaction proceeds too rapidly, the water is released at too fast a rate and the excess tends to drain from the granules dissolving some of the ammonium salt and carrying it away from contact with the particles. If this is permitted, the reaction will not proceed to completion and the resulting product tends to be in the form of fused agglomerates which upon cracking and crushing will contain irregularly shaped fractured particles and substantial quantities of powder and dust.

The rate of the reaction is controlled by controlling the temperature. A suitable rate is achieved if the mix is maintained at about normal room temperature. At this temperature, the first stage of the reaction is completed in twenty-four to thirty-six hours. Completion of the first stage of the reaction is detected by the disappearance from the surface of the granules of any visible ammonium salt particles when inspected under a low power glass. The overall time required for the first stage of the reaction may be reduced somewhat by gradually raising the temperature of the mixture to a temperature not in excess of 110° F. The reaction temperature need not be as high as even normal room temperature if longer reaction times are not objectionable, although at temperatures below about 40° the reaction substantially ceases.

Once the first stage of the reaction has been completed and there are no crystals or particles of the ammonium salt visible on the surface of the granules, the temperature if desired may be raised to a higher level to force to completion the reaction of the ammonium salt with the metasilicate. Good results are obtained by holding the reaction mixture at about 130° F. to 140° F. for 24 to 36 hours. Slightly higher temperatures can be used. However, it is essential that no portion of the mixture reach a temperature in excess of or even approaching the melting point of the metasilicate (i.e. 162° F. in the case of sodium metasilicate pentahydrate) while any substantial quantity of the metasilicate remains unreacted.

Completion of the reaction is indicated by the absence of any substantial evolution of ammonia while the reaction mixture is maintained at 140° F. As soon as the reaction has been completed, the temperature may be raised to 160° F., to 180° F. or even higher to drive off the remaining water and to harden the particles. Upon completion of the reaction and after cooling, the resulting large block of activated silica gel granules break up readily into spherical granules of approximately the same size and shape as the original metasilicate granules. The finished granules may be washed if desired to remove all or part of the salt content. Because of their uniform size and shape these activated silica gel granules may be used for a variety of purposes and are particularly advantageous for use in packed columns for the purification of gases.

EXAMPLE 1

I have discovered that a simple inexpensive way to make highly porous silica gel granules that are automatically treated by inorganic chlorides during the course of manufacture is to mix granules of a soluble silicate containing water of hydration, such as sodium metasilicate pentahydrate, $Na_2SiO_3 \cdot 5H_2O$, with powdered ammonium chloride, allow this mixture to react for several hours and then dry to remove the water. The resulting loosely agglomerated product is easily crushed to form granules of silica gel of approximately the same size and shape as the original granules of sodium metasilicate pentahydrate. The surfaces of the tiny pores of these silica gel granules are "wetted" or coated with sodium chloride and ammonium chloride by this method.

|  | Grams |
|---|---|
| Sodium silicate pentahydrate (10–20 mesh U.S.) | 1000 |
| Powdered ammonium chloride | 600 |
| Total weight | 1600 |

These ingredients were mixed by hand with a large spoon in a bowl for ten minutes. During the mixing, strong ammonia vapors were evolved and the mix became very moist. This was caused by the reaction of the sodium metasilicate pentahydrate with the powdered ammonium chloride, releasing ammonium gas and water as follows:

$$Na_2SiO_3 \cdot 5H_2O + 2NH_4Cl \rightarrow SiO_2 + 2NaCl + 2NH_3 + 6H_2O$$

In damp, humid weather, the reaction starts almost immediately. In dry weather, the reaction is slower to start, but, once started, it proceeds at a steady pace. However, it takes time for the small ammonium chloride crystals which coat the sodium metasilicate granules in the form of a moist slurry to dissolve and enter the metasilicate granules by osmotic action. In doing so, more free water is produced, both by the chemical reaction of $Na_2SiO_3$ and $NH_4Cl$ and by the release of the five molecules of water of hydration. This water dissolves more ammnoium chloride, which in turn reacts with more of sodium metasilicate within the granule and, thus, the reaction proceeds.

In dry weather, it is desirable to "trigger" or speed up the start of the reaction by mixing in about 1% of water after the sodium metasilicate pentahydrate and ammonium chloride have been dry mixed or damp mixed for a few minutes. The quantity of added water must be small, about 1%, because it is desirable to keep the small crystals of ammonium chloride on the larger granules of sodium metasilicate pentahydrate in the form of a wet slurry.

I then allowed this wet mix to stand at room temperature for 36 hours. The wet mix was then transferred to a shallow pan and dried in a hot air forced conventional dryer at 130°–150° F. for 36 hours. The temperature was then raised to 160° F. for 12 hours. The silica gel granules were in the form of a loosely agglomerated block. This block was readily broken up and easily crushed by forcing through an 8-mesh screen. The granules were crisp and dry and had approximately the same size and shape as the original granules of the 10–20 mesh sodium metasilicate pentahydrate.

The 1600 grams total weight of ingredients yielded 935 grams of final product. Hence, the loss of water and ammonia totalled 665 grams. On a stoichiometric basis, 510 grams of ammonium chloride would fully react with 1000 grams of sodium metasilicate pentahydrate containing 295 grams of $Na_2O$, 287 grams of $SiO_2$ and 417 grams of $H_2O$.

Assuming complete reaction of the silicate, the calculated composition is as follows:

CALCULATED COMPOSITION OF SUPERCHARGED SILICA GEL GRANULES #1

|  | Dry basis, percent by weight |
|---|---|
| $SiO_2$ | 30.7 |
| NaCl | 59.7 |
| $NH_4Cl$ | 9.6 |
| Total | 100.0 |

The physical proportions are as follows:

| | |
|---|---|
| Bulk density of SSG#1, grams per cc. | 0.65 |
| Calculated particle density, grams per cc. | 1.10 |
| Pore volume with salts, cc. per gram | 0.55 |
| Skeletal density | 2.2 |
| Bulk density of salt free granules, grams per cc. | 0.38 |
| Calculated particle density of salt free granules, grams per cc. | 0.63 |
| Pore volume of salt free granules, cc. per gram | 1.12 |

These granules were mixed with various formulations of zinc ammonium chloride fluxes and found to be extremely effective in extending the life of the flux when applied to solder baths operating at temperatures well above the boiling point of the ammonium chloride constituent in the flux. These test results are recorded in the examples of solder roll fluxes.

EXAMPLE 2

The stoichiometric ratio of ammonium chloride to react fully with sodium metasilicate pentahydrate is 51 parts by weight of ammonium chloride to 100 parts of metasilicate. In Example 2, I, therefore, used a ratio of 52 parts of ammonium chloride per 100 parts of metasilicate in order to have a small excess, but only a small excess, of ammonium chloride. This ratio is, however, not critical.

In my work with Example 1, I had learned that my simple, inexpensive way of making highly porous silica gel granules resulted in a product wherein the size and shape of the original metasilicate particles had not been substantially altered. I, therefore, purchase a grade of sodium metasilicate pentahydrate which is commercially available in uniform sized "dry" spherical granules. These spherical granules are available in various mesh sizes. I used a grade which is rated 10–20 mesh and had the following screen analysis.

| Percentage: | U.S. screen numbers |
|---|---|
| 2% maximum | On #8. |
| 90% minimum | Through #10 and on #20. |
| 10% maximum | Through #20 and on #40. |
| 1% | Through #60. |

Example 2 was made by the method used in Example 1 using this grade of metasilicate and to the following formulation:

| | Grams |
|---|---|
| Sodium metasilicate pentahydrate (spherical granules 10–20 mesh) | 1000 |
| Powdered ammonium chloride | 520 |
| Total weight | 1520 |

After drying for 36 hours at 130°–140° F., the temperature was raised to 160° F. for 12 hours. The yield of dry silica gel obtained from the 1520 grams of mix was 850 grams.

The calculated composition is as follows:

| | Percent by weight |
|---|---|
| $SiO_2$ | 33.4 |
| NaCl | 64.8 |
| $NH_4Cl$ | 1.8 |
| Total | 100.0 |

The size and shape of these silica gel granules #4 are substantially the same as the original spherical metasilicate granules before the slow osmotic reaction with ammonium chloride. However, when the soluble salts had been removed from the silica gel granules, there was a large reduction in bulk volume. 100 cc. bulk volume of silica gel granules of Example 2 decreased to a bulk volume of 55 cc. of pure silica gel granules having a bulk density of 0.38 gram per cc. There was a corresponding reduction in the size of the granules.

The physical properties of the silica gel granules free of salts are:

| | |
|---|---|
| Bulk density | 0.38 g. per cc. |
| Skeletal density | 2.20 g. per cc. |
| Particle density | 0.63 g. per cc. |
| Pore volume | 1.12 cc. per gram. |
| Size | 10 to 40 mesh U.S. |

The silica gel granules of Example 2 proved to be a highly efficient flux life extender over a wide range of ratios of bulk volume of pure silica gel granules per 100 cc. of melted flux. It is classed as a superchargeable granule because it does not have a substantial quantity of ammonium chloride or zinc chloride or other active fluxing ingredient. However, silica gel granules of Example 2 is very porous and highly adsorbent, so it readily adsorbs a large quantity of the freshly melted zinc ammonium chloride flux which is rich in ammonium chloride.

EXAMPLE 3

The silica gel granules of Example 3 are made by the procedure described in Example 1. It uses the same sodium metasilicate pentahydrate but mixes these granules initially for 15 minutes with moist zinc ammonium chloride ($ZnCl_2 \cdot 2NH_4Cl$). Ammonium chloride is then added and mixed in for 5 to 10 minutes.

The formulation is as follows:

| | Grams |
|---|---|
| Sodium silicate pentahydrate | 950 |
| Zinc ammonium chloride | 100 |
| Ammonium chloride | 500 |
| Total weight | 1650 |

The wet mix was allowed to stand 36 hours and was then dried for 36 hours at 135° F. in a shallow pan. The yield of dry silica gel granules was 986 grams. It had the following calculated composition.

| | Percent |
|---|---|
| $SiO_2$ | 27.6 |
| $ZnCl_2$ | 5.6 |
| NaCl | 53.5 |
| $NH_4Cl$ | 6.2 |
| Water by diff. | 7.1 |
| | 100.0 |

The silica gel granules of Example 3 were incorporated in Flux T which had a flux life of 16 hours on a solder roll at 725° F., proving that the silica gel granules of Example 3 are a highly efficient flux life extender.

In the foregoing examples, the terms "bulk density," "particle density" and "skeletal density" were used with the following meanings:

Bulk density, expressed as grams per cubic centimeter, is the weight of one cubic centimeter of the loose packed granules.

Particle density is the weight in grams of one cubic centimeter of actual volume of the individual particles. In general, when the granules are relatively uniform in size the actual volume of the granules is 60% of the total bulk volume, the remaining 40% being the volume of the voids surrounding the particles.

Skeletal density is the density in grams per cubic centimeter of the material from which the porous granule is made, that is its skeleton.

While the flux life extenders of the present invention have been described for use in combination with zinc ammonium chloride flux compositions, their activity is physical in nature. For this reason the chemical identity of the particular flux with which they are used is of no particular importance. These flux life extenders are equally useful and effective in any melted flux where one component is more volatile than the mass of melted flux and they may be used as indicated in Example 2 to introduce other components slowly into a melted flux composition.

I claim:

1. In a process for the preparation of silica gel granules by the reaction of a finely divided ammonium salt with regularly shaped alkali metal metasilicate hydrate granules at a temperature below 110° F., the improvement which comprises carrying out the reaction in the absence of more than about one percent added water and recovering light, porous, regularly shaped silica gel granules.

2. The process of claim 1, including the step of accelerating the reaction after the particles of ammonium salt are no longer visible by subjecting the mixture to an elevated temperature between 110° F. and the melting point of the alkali metal metasilicate.

3. The process of claim 2, wherein the elevated temperature is between 130 and 140° F.

4. The process of claim 1, wherein the alkali metal metasilicate is a sodium metasilicate and the ammonium salt is ammonium chloride.

References Cited

UNITED STATES PATENTS 1,687,919   10/1928   Yablick _____ 23—182

OSCAR R. VERTIZ, Primary Examiner

G. O. PETERS, Assistant Examiner